Figure 3:
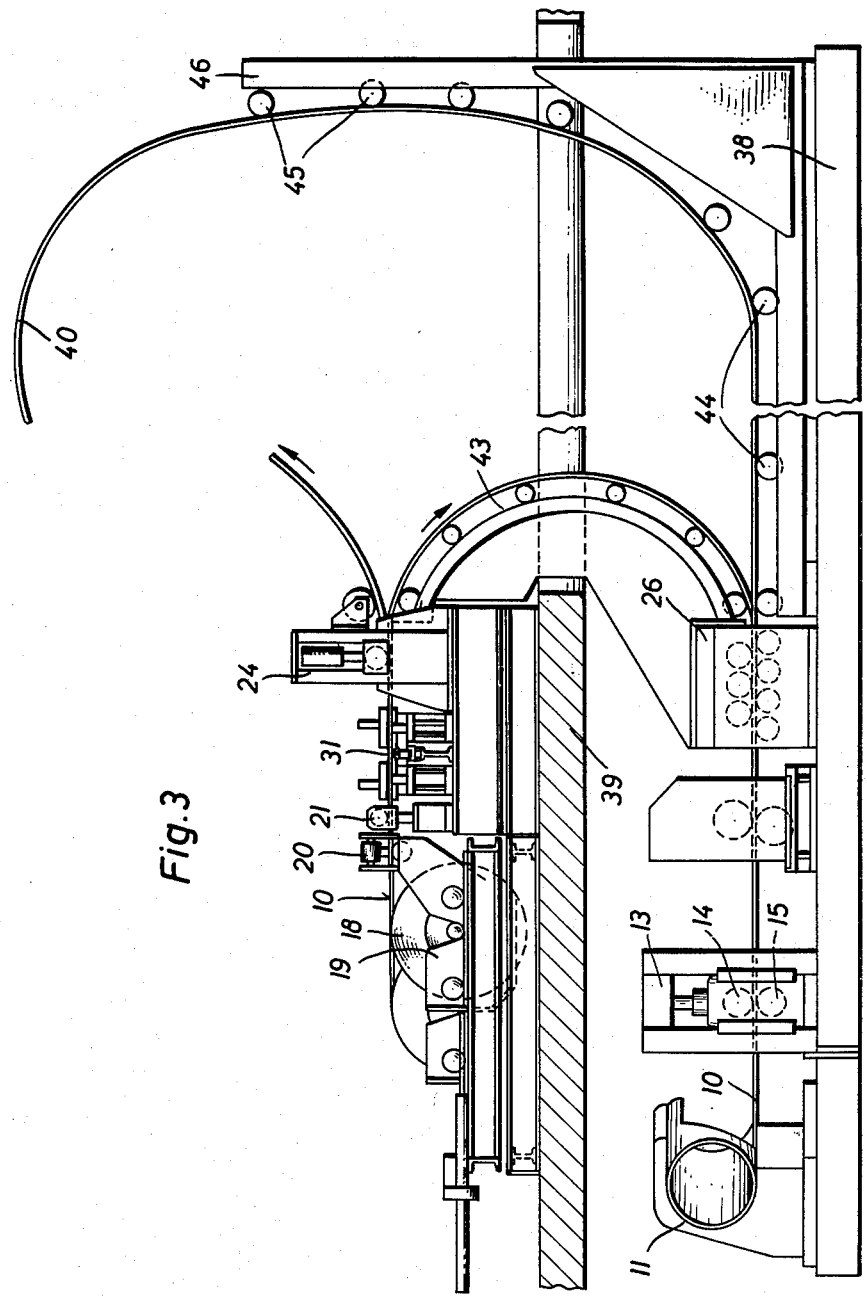

Dec. 17, 1963   R. DIENER   3,114,341
TUBE-WELDING MACHINES
Filed June 28, 1960   3 Sheets-Sheet 1
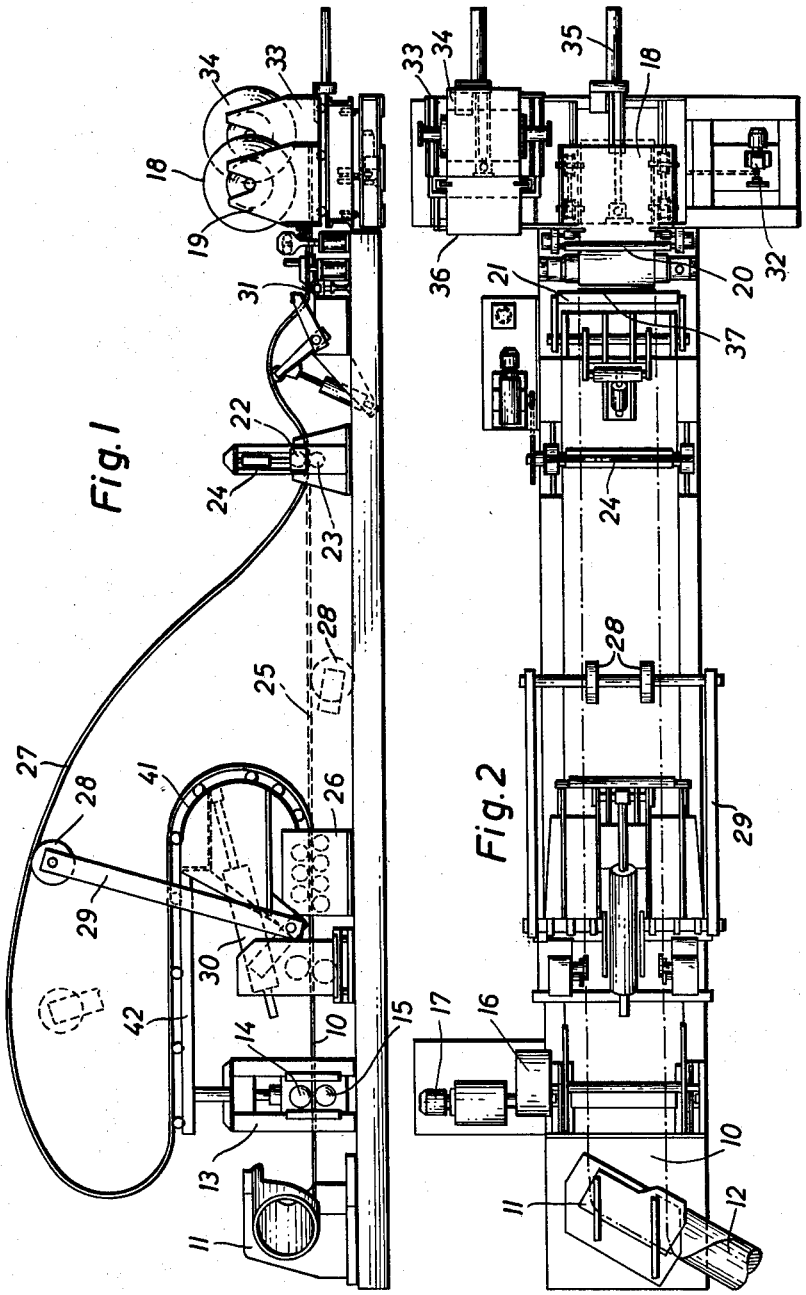
INVENTOR
Richard Diener Dec. 17, 1963  R. DIENER  3,114,341
TUBE-WELDING MACHINES
Filed June 28, 1960  3 Sheets-Sheet 2

INVENTOR
Richard Diener
BY
Att'y

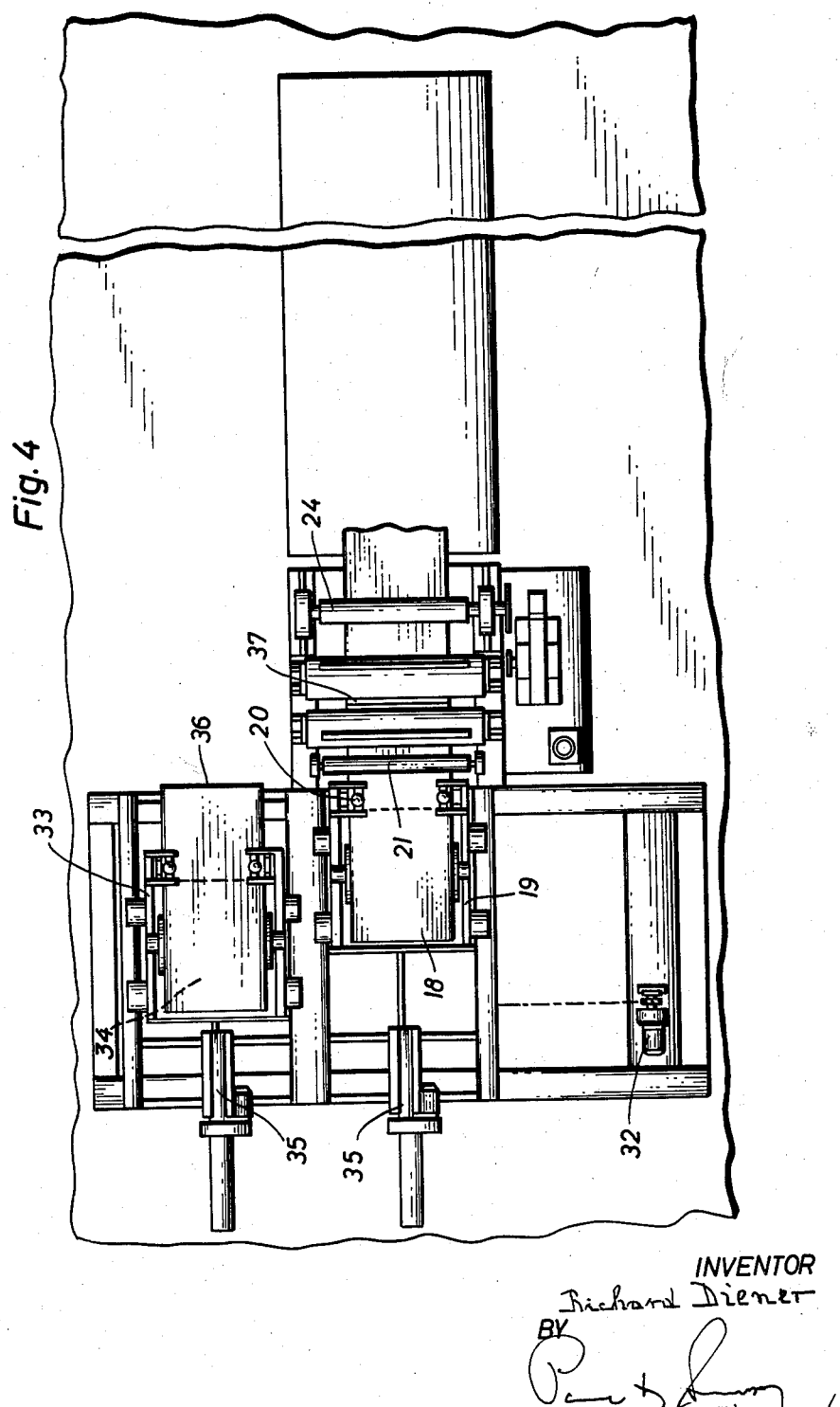

United States Patent Office 3,114,341
Patented Dec. 17, 1963

3,114,341
TUBE-WELDING MACHINES
Richard Diener, Berlin-Hermsdorf, Germany, assignor to Hoesch Aktiengesellschaft, Dortmund, Germany
Filed June 28, 1960, Ser. No. 39,273
Claims priority, application Germany July 9, 1959
3 Claims. (Cl. 113—35)

My invention relates to machines for continuous welding of tubings or pipings from flat strips of steel i.e. skelp.

In known machines of that type the skelp is drawn by rollers or similar driving means from a coil and is fed by the same driving means into conventional skelp bending and tube welding means forming part of the machine, while provisions are made for accumulating slack in the forward moving skelp prior to its entering the said bending and tube welding means in order that the accumulated skelp within the slack may be utilized for continuously supplying said bending and tube welding means during periods when new lengths of skelp coming from another coil are being connected i.e. butt-welded to the strip of skelp already in the machine and about to be exhausted. More particularly in said known machines the slack accumulating means comprise a system of rollers over which the strip of skelp is forced to travel in multiple back and forth winding folds before reaching said driving means, one of said rollers being mounted movably relative to the others to effect an extension of the folds prior to said butt-welding operation and a release of the folds during said butt-welding operation. Such release, however, was never complete and the strip of skelp had constantly to travel on a winding and thus unnecessarily extended path from the coil to said driving means.

The said known machines though complicated and space consuming in construction worked quite satisfactorily in the manufacture of tubes from skelp having a thickness not exceeding at the most about three millimeters. To make such machines applicable for processing skelp of greater thickness would result in an extremely heavy and clumsy machine difficult to operate, because such skelp would require the use of rollers of substantial diameters within the slack accumulator and a high power consumption to effect the repeated bending of the skelp; additionally, the repeated bending of heavy skelp in changing directions to form the back and forth winding folds would result in an inadmissible wear hardening.

It is an object of my invention to avoid the said and other disadvantages of the known machines and to provide machines forming tubings and pipings from skelp with means which will not only continuously supply skelp to the bending and tube welding means but which are efficiently applicable to skelp of substantial thickness for example twelve millimeters or even more.

Like the known machines my new machine comprises driving means, hereinafter referred to as first driving means, for continuously feeding the strip of skelp with constant speed into the bending device which bends the skelp into tubular form prior to welding. According to my invention my new machine is additionally provided with a second driving means which draws a strip of skelp from a coil and which can be temporarily arrested and temporarily driven at higher speed than the first driving means. Further, the machine according to the invention is provided with a clamping device for the end of the strip of skelp which has been operated on and nearly used up. Thus my new machine permits, shortly before exhaustion of the operated on strip and without any alteration of the speed of the tube welding, to form a loop in said strip by increasing the speed with which it is fed forwards by the second driving means arranged in adequately spaced relation to said first driving means and thereafter to arrest or otherwise inactivate the second driving means, so that the end of the operated on or first strip also comes to rest and can be clamped to make it available for butt welding a new or continuation strip to it. During this butt-welding operation, the first strip runs with unaltered speed through the bending device, the accumulated material in its loop being used up and the loop continuously reduced in size. The size of the loop to be formed, therefore, depends on the time necessary to butt weld the said two strips of skelp together. Since practically any size of the loop in the strip may be formed, sufficient time can be made available for safely butt-welding said strips.

In order to keep the time necessary for such butt welding as small as possible, according to a further feature of the invention, two brackets each of which supports a skelp coil are arranged one beside the other and can be brought into an operative position relative to the second driving means by alternately moving them transversely to the direction of movement of the strip of skelp. The bracket which is put into operative position is preferably also movable in the direction of movement of the strip, in order to bring the ends of the strip to be welded together into contact with one another.

The shape of the loop and the direction in which the loop is formed is, fundamentally, of no consequence. In the preferred form of construction of the machine of the invention, the loop is so formed that it extends vertically upwards. It is then possible to use the machine to weld helically bent skelp in which case the strip of skelp must be fed to the bending device at an angle to the axis of the tube, the angle depending both on the selected diameter of the tube being made and also on the width of the strip. The formation of the loop in a vertically upward direction enables the entire mechanism which precedes the bending device to be swingably arranged on a base frame and, therefore, enables the angle at which the strip is fed forwards to be altered.

If the strip of skelp is withdrawn from the upper side of the coil and the curvature of the strip in the bending device is in the same sense as the curvature in the coil, the strip between the coil and the bending device has the tendency to form a loop which is arched upwardly and only a few guiding or restraining means are necessary for limiting the loop. If these conditions are not present and if the strip is withdrawn from the underside of the coil and, therefore, has the tendency to form a loop extending in a vertically downward direction, use may be made of a loop-forming device which acts in an opposite direction. In the preferred form of construction, however, even when the sense of the curvature in the bending tends to produce a loop which extends vertically downwards, use is made of the natural tendency of the strip to curve in the sense which corresponds to its curvature in the coil, namely by arranging the bending device below or, considered in the direction in which the strip emerges from the coil, behind the supporting bracket of the coil.

Two embodiments of a machine in accordance with the invention are illustrated, by way of example, in the accompanying drawings, in which FIGURE 1 is a side elevation of a first embodiment,
FIGURE 2 a top plan view thereof,
FIGURE 3 is a side elevation of a second embodiment, and
FIGURE 4 a top plan view thereof.

As shown in the drawings, in each of the illustrated two embodiments a steel strip or skelp 10 is fed tangentially into a skelp bending device such as a winding sleeve 11 in which the skelp is bent helically to form a tube 12. The conventional welding device which is located near the outlet end of the sleeve 11 is not illustrated. The strip 10 is fed to the sleeve 11 by a first driving means 13 which comprises of two rolls 14 and 15 of which one roll is driven through gearing 16 from a motor 17. In operation the driving means 13 runs at constant speed. Consequently the tube welding speed also remains constant. The strip 10 is withdrawn from a coil 18 which is mounted on a support or bracket 19. The strip coming from the bracket 19 passes through two normally open clamping devices 20 and 21 and through a second driving means 24 comprising of two rolls 22 and 23 and thereafter runs along the dotted line 25 through a straightening device 26 to the above mentioned first driving means 13. Between the straightening device 26 and the first driving means 13 a trimming device for the edges of the strip may be provided. The rolls 14 and 15 of the first driving means 13 rotate with the same speed as the rolls 22 and 23 of the said second driving means 24, the driving motor of which can however be disconnected so that the rolls 22 and 23 are freely rotated by the advancing strip.

When the coil 18 is about to be used up, the speed with which the skelp strip is fed forwards by the second driving means 24 is considerably increased, for example double, without however altering the speed with which the strip is fed forwards by the first driving means 13. This difference of speeds will result in the free formation of a loop 27 between the second driving means 24 and the straightening device 26. This loop 27 may be supported by lever means 29 carrying a roller 28 which is brought by a hydraulic drive 30 from the down lying position shown in FIG. 2 and partially in dotted lines in FIG. 1 into the upstanding position illustrated in full lines in FIGURE 1. While the first driving means 13 continues to rotate with constant speed, the second driving means 24 is arrested shortly before the end edge of the operated on strip 10, coming from coil 18, reaches the position 37. Previously, the support 19 of said coil 18 which has been used up has been moved laterally from its operating position by actuating means 32, and a second support 33 which carries a new skelp coil 34 is brought into the central operating position. The front edge 36 of the strip which has previously been straightened is brought butt to butt with the end edge 37 of the used skelp strip 10 by moving the support 33 forwards by actuating means 35 and the two ends 36, 37 are butt-welded together. All this takes place while the first driving means 13 takes skelp from the supply provided by the loop 27. This leaves sufficient time to complete said butt-welding to and if desired to make welding seams from both sides so as to obtain a particularly firm and clean connection.

During the formation of the loop 27 care should be taken that a sufficient length of skelp is stored in the loop in order that the welding of the tube may proceed continuously during the time which is necessary to butt-weld together the ends 36 and 37 of the two strips. When this has been done, the clamping devices 20 and 21 holding the ends of the strips to be welded are again released. Thereafter the skelp feeding to the bending means again proceeds normally until the loop 27 disappears.

The loop-forming device consisting of the roll 28, the lever means 29 and the hydraulic actuating means 30 has been illustrated in a simplified form in FIGURE 1 for the sake of clarity. Usually, a single lever means 29, as shown in this figure, will not be sufficient to form and/or to support the loop 27, because the distance between the points at which the strip is supported is too great. A further lever with roller can be arranged near the support of the driving means 24, so as to act on the section of the strip between the driving means 24 and the roll 28. Also, a still further loop-forming or supporting device can, if necessary, be arranged on the other side of the lever 29 in FIGURE 1, that is to say to the left of it.

A device for forming the loop is necessary in the construction illustrated in FIGURES 1 and 2, because within the loop the sense of the curvature of the strip of skelp is opposite to that in the coil 18. A trench or pit could be arranged between the driving means 24 and the straightening device 26 in order to enable a loop to be formed in a downward direction, the curvature of which would be the same as that of the inherent curvature of the strip. In this case, however, it would no longer be possible to alter the angle between the strip 10 and the axis of the tube 12 emerging from the bending sleeve 11 such alterations being necessary when tubes of different diameter or made from skelp of different width are to be produced on one and the same machine. If provision is made for the formation of the loop in a vertically upward direction, then the entire device which has been illustrated, with the exception of the sleeve 11, can be swingably arranged on the foundation of the machine for the purpose of altering the aforesaid angle.

In FIGURES 3 and 4 showing the second embodiment of my new machine all the parts of the machine which have already been described with respect to the first embodiment illustrated in FIGURES 1 and 2 are designated by the same reference numerals. The essential difference between the two embodiments is that in the second embodiment the elements which in the direction of the movement of the skelp precede the loop are arranged above the elements into which the skelp enters after having formed the loop. As will be seen in particular from FIGURE 3 the tube-forming sleeve 11, the first driving means 13 and the straightening device 26 are arranged as in FIGURES 1 and 2 on a base plate 38 which is mounted directly on the foundation. The remaining elements, that is to say the supports for the coil 18 which is being operated on and for the coil 34 in reserve, the clamping devices 20 and 21 and the second driving means 24 are, however, mounted on a raised platform 39 which extends above the elements mounted on the base plate 38.

In FIGURES 3 and 4 as distinguished from FIGURES 1 and 2, the strip is taken from the top of the coil 18 and has, therefore, the tendency to curve downwardly along the semicircular roller track 43. If the speed of feed of the second driving means 24 is increased while that of the first driving means 13 remains unchanged, a loop 40 is formed automatically without any substantial outside assistance. The omission of means for forming the loop is, however, only one of the advantages of this form of construction. The division of the elements of the machine into two groups arranged one above the other also effects a saving in space.

For the purpose of altering the angle of pitch of the welding seam of the formed tube which angle depends on the diameter of the tube and on the width of the skelp, the entire machine can also be swung about a vertical axis relative to the stationary sleeve 11.

The use of the inherent curvature in the strip of skelp for forming the loop is possible in the same way as in FIGURE 3 if the elements which in FIGURE 3 are mounted on the upper platform 39, are disposed behind the bending device, namely in FIGURE 3 to the left of the winding sleeve 11. However, the construction shown in FIGURE 3 is preferable.

In both embodiments guides and supports for the skelp are provided between the driving means 24 and the straightening device 26. In the first embodiment shown in FIGURES 1 and 2 the skelp requires no separate guidance in said region as long as no loop is formed. For the formation of the loop in this first embodiment there is provided a roller track which consists of a curved section 41 and a straight section 42. In the second embodiment shown in FIGURES 3 and 4 the strip of skelp is leaving the second driving means 24 is normally guided along a semi-circular roller track 43 to the straightening or adjusting device 26. For limiting the size of the loop 40, rollers 44 are arranged on the base plate 38 and further rollers 45 are arranged vertically one above another on a standard 46.

The kind of bending apparatus in which the skelp is brought into tubular form is of no importance for the present invention. Instead of the winding sleeve 11 described above and illustrated in the drawing, a rotating mandrel which is coupled to a driving means can be employed.

The invention is particularly applicable to the manufacture of tubes with helical welding seams.

While two specific embodiments of my invention have been shown and described in detail to illustrate the application of the principles of my invention, it will be well understood that the same may be otherwise embodied without departing from such principles and without avoiding the scope of the appended claims.

What I claim as my invention is:

1. In a machine for making tubes from flat skelp including bending means for helically shaping skelp into tube formation and first drive means continuously feeding skelp to said bending means at a predeterminable constant speed, the improvement comprising in combination
    (a) a first support rotatably holding an operating skelp coil and a second support rotatably holding a substituting reserve skelp coil;
    (b) second drive means drawing skelp from the operating coil in substantially horizontal direction and pushing the same towards the first drive means;
    (c) clamping means temporarily holding in adjacent relation the rear end of the skelp payed out by the operating coil and the front end of the reserve coil, and butt-welding means to connect said ends while the same are clamped, both means located between said coil supports and said second drive means;
    (d) speed control means for said second drive means adjustable to keep the speed thereof even with the constant speed of the first drive means thereby causing the skelp to move equably and straight between said drive means; to increase the said speed while the momentarily operated coil is about to be exhausted and thus causing the forwardly pushed skelp to freely bend into a single loop between said two drive means, and to inactivate said second drive means while said clamping means and said butt-welding means are operated and the previously accumulated loop in the skelp is consumed being fed by the first drive means into said bending means;
    (e) and positioning means alternately placing one of the said supports into alignment with said second drive means to bring a reserve coil into operating position relative thereto and to said clamping means and said butt-welding means.

2. In a machine for making tubes from flat skelp including bending means for helically shaping skelp into tube formation and first drive means continuously feeding skelp to said bending means at a predeterminable constant speed, the improvement comprising in combination
    (a) a first support rotatably holding an operating skelp coil and a second support rotatably holding a substituting reserve skelp coil;
    (b) second drive means drawing skelp from the operating coil in substantially horizontal direction and pushing the same towards the first drive means;
    (c) clamping means temporarily holding in adjacent relation the rear end of the skelp payed out by the operating coil and the front end of the reserve coil, and butt-welding means to connect said ends while the same are clamped, both means located between said coil supports and said second drive means;
    (d) speed control means for said second drive means adjustable to keep the speed thereof even with the constant speed of the first drive means thereby causing the skelp to move equably and straight between said drive means; to increase the said speed while the momentarily operated coil is about to be exhausted and thus causing the forwardly pushed skelp to freely bend into a single loop between said two drive means, and to inactivate said second drive means while said clamping means and said butt-welding means are operated and the previously accumulated loop in the skelp is consumed being fed by the first drive means into said bending means;
    (e) a stage member preceding said second drive means and sustaining the said first and second support means next to each other operably relative to the second drive means;
    (f) said stage member reciprocably displaceable perpendicularly to the direction of movement of the unwinding skelp to bring the momentary skelp coil in operative alignment with the second drive means after the momentarily operating skelp coil is exhausted and each of said first and second supports being displaceable on said stage member in the direcof movement of the skelp to bring the front end of the reserve coil, after the same was brought into operative alignment with the second drive means, into abutting contact with the rear end of the skelp wound off from the operating coil.

3. A machine for making tubes from flat skelp comprising in combination
    (a) a support for each of a first or operating and for a second or reserve coil each support rotatably holding one skelp coil for alternate use;
    (b) pulling drive means drawing skelp from the operating coil in substantially horizontal direction;
    (c) clamping means temporarily holding in adjacent relation the rear end of the skelp payed out by the operating coil and the front end of the reserve coil, and butt-welding means to connect said ends of the skelps while the same are clamped in end to end contact, both means located between said coil supports and said pulling drive means;
    (d) bending means for helically shaping skelp into tube formation and feeding drive means supplying skelp thereto at a predeterminable constant speed, said bending means and feeding drive means so located underneath the said coil supports and pulling drive means that the skelp leaves the pulling drive means in a direction opposite to the direction in which the skelp enters the feeding drive means;
    (e) a curved support detachably guiding the forward moving skelp from the higher located pulling drive means to the lower located feeding drive means;
    (f) stationary curved guide means located in front of and in spaced relation to said curved support and adapted to abuttingly support loop formations in the skelp and to guide the same into the feeding drive means;
    (g) and adjustable speed control means for said pulling drive means to keep the speed thereof even with the constant speed of the feeding drive means while the skelp is guided by said curved support, to increase the speed of the pulling drive means while the momentarily operated coil is about to be exhausted and thus causing the forwardly pushed skelp to form a loop between said two drive means, and to inactivate said pulling drive means while said clamping means and said butt-welding means are operated and the previously accumulated loop in the skelp is consumed being fed by the feeding drive means into said bending means.

References Cited in the file of this patent

UNITED STATES PATENTS

| | | |
|---|---|---|
| 1,721,352 | Naugle et al. | July 16, 1929 |
| 1,807,813 | White | June 2, 1931 |

(Other references on following page)

UNITED STATES PATENTS

| | | |
|---|---|---|
| 2,025,418 | Moore | Dec. 24, 1935 |
| 2,075,192 | George | Mar. 30, 1937 |
| 2,127,618 | Riemenschneider | Aug. 23, 1938 |
| 2,196,192 | Broadfield | Apr. 9, 1940 |
| 2,606,136 | Garrett et al. | Aug. 5, 1952 |
| 2,710,565 | Schroeder | June 14, 1955 |
| 2,748,734 | Kennedy | June 5, 1956 |
| 3,030,488 | Kuchens | Apr. 17, 1962 |

FOREIGN PATENTS

| | | |
|---|---|---|
| 146,374 | Australia | Sept. 8, 1949 |
| 360,847 | Italy | Apr. 7, 1938 |